Figures 1, 2:
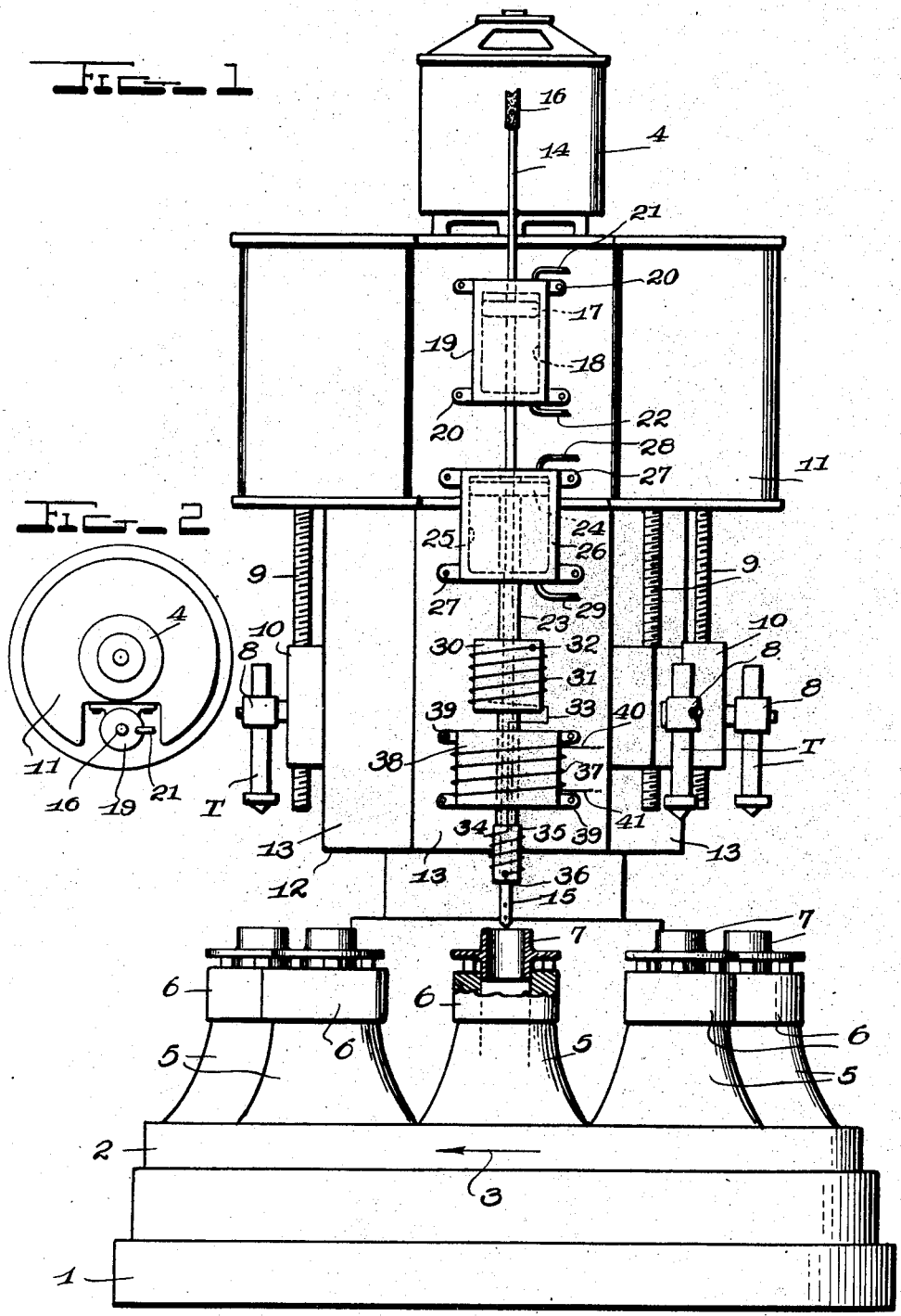

Dec. 12, 1939.  W. H. FARR  2,182,799

HEAT TREATING MACHINE TOOL

Filed May 28, 1938

INVENTOR.
Warren H. Farr
BY John P. Tarbox
ATTORNEY.

Patented Dec. 12, 1939

2,182,799

UNITED STATES PATENT OFFICE 2,182,799

HEAT TREATING MACHINE TOOL

Warren H. Farr, Detroit, Mich., assignor to Budd Wheel Company, Philadelphia, Pa., a corporation of Pennsylvania Application May 28, 1938, Serial No. 210,719

7 Claims. (Cl. 29—38)

The present invention relates to means for hardening metals.

More specifically, it relates to a high frequency electric heating device combined with a nozzle for a quenching liquid, intended to harden primarily the inner surface portions of a hollow object.

Still more specifically, the invention relates to combining a hardening means of this type with a machine for performing machining operations on the article, and wherein the hardening device forms a component part or "tool" of such machine.

Heretofore in the hardening of metal articles it has been customary to do the machining and the hardening in separate machines. This is wasteful of both time and space since it is necessary to remove the article which has been machined from the machine tool which has done the work and then to insert and adjust the article in the device which is to perform the heating and hardening operations, which requires skilled manual labor.

By combining a novel kind of hardening device with a machine tool which performs a series of operations on the article, it is possible to carry out the heating and hardening as some of the routine operations performed by the machine, so that a single chucking of the blank article is all that is necessary until the finished article, completely machined and hardened, is finally removed from the tool.

Machines are known wherein a number of chucks rotating about vertical axes, evenly and symmetrically spaced about the vertical axis of the machine as a whole, are brought into successive machining positions by suitable gearing and the like in the machine tool, so that the operations of the machine are performed one after another, by means of a group of tools which are aligned with the axes of the respective chucks, the machine having means for advancing and retracting the various tools after the chucks have been brought into proper position to align with such tools.

The heating and hardening device embodied in the present invention has been combined with a machine of this type by modifying the machine to the extent that was necessary to accommodate such heating and hardening means, which ordinarily would not fit in the space available in conventional tools of this kind.

A particular tool which is well adapted for this purpose is the one known to the trade as the "Multimatic", such, for example, as is disclosed in U. S. Patents 1,258,089, 1,360,175, and others.

A combined tool suitable for carrying out my invention is illustrated in the accompanying drawing, wherein:

Figure 1 is a diagrammatic front elevation of the machine, certain parts being shown in section and Figure 2 is a diagrammatic plan view, on a very much reduced scale, of the machine illustrated in Figure 1.

Referring to Figure 1 the machine comprises a base 1, upon which is mounted a turntable 2, which is rotated in the direction of the arrow 3 by mechanism controlled by the motor 4 mounted on top of the machine. The turntable 2 carries a series of pedestals 5, eight being included in the present case, each of which carries a chuck 6 at its upper end. These chucks have their axes vertical and each chuck is given rotary movement by mechanism contained within the base 1 and turntable 2, from power supplied by the motor 4.

These chucks are intended to receive work-pieces, here shown as wheel hubs 7.

The chuck 6, immediately to the left of the center, is one which serves as the loading and unloading station for the machine tool, that is, this chuck is the one in which the article is originally placed in order to subject it to the machining operations and also is the one from which the article is removed after the machine has performed all its operations on the work-piece. It will be understood that the conveyor 2 rotates only at intervals and between such intervals the specific machining operations are performed on the respective work-pieces by the tools with which they are aligned. These tools are shown diagrammatically, axially and vertically aligned with the respective chucks, the tools being designated by reference character T in each case and no attempt being made to indicate their specific natures, since it will be obvious that any tools suitable for the desired operations on the work-pieces will be applied to the tool holders 8, 8, etc. These tools T are fed to and from the work by means of the screws 9, which coact with the carriages 10, supporting the tools and the screws 9 are in turn rotated by suitable mechanism contained in the upper casing 11 of the machine.

It will be noted that while in the patented machines above referred to the upper casing is completely cylindrical, in the present instance this casing has been modified by removing a portion from the front thereof so as to make room for the heating and hardening appliance, forming part of the present invention.

Each of the carriages 10 moves in proper guide means, not shown, on one of the surfaces of the prismatic pillar 12 forming part of the machine and having a number of prism faces, such as 13, eight being embodied in the present device, that is, the pillar in the present device is an octagonal prism, shown in front elevation, with three of its faces or facets 13 visible. Each of these facets, with the exception of the one immediately to the left of the central one, carries a tool for operating on the work-piece, the one at the loading and unloading station being, of course, left blank so that the operator may insert and remove the work-pieces on the corresponding chuck during the time that no tool is acting on such work-piece.

While all the tools T, as stated, may be of various conventional natures, the particular tool located on the front panel 13 is the heating and hardening device forming an important component of the present invention. This heating and hardening device is shown in full detail in my copending case Serial No. 96,346, filed August 17, 1936, and such case should be referred to for any further information concerning the actual structure involved.

The present showing of the heating and hardening means is purely diagrammatic and comprises a tubular member 14 which extends vertically downward and terminates in the spray nozzle 15 which is adapted to spray a chilling liquid against the interior of a work-piece 7, and a flexible tube 16 attached to the upper end of the tube 14 to supply the said quenching liquid. The vertical position of the tube 14 is controlled by means of a piston 17 attached thereto and operating within the bore 18 of a pneumatic cylinder 19 attached to the machine in any suitable way, as by the fastening lugs 20. Compressed air for operating the piston 17 within its cylinder may be supplied to said cylinder through the corresponding pipes 21 and 22 by means of suitable valve mechanism illustrated in the copending case.

Concentric with the pipe 14 and surrounding the same is a further tubular member 23 which carries at its upper end a piston 24 operating within the bore 25 of a cylinder 26 secured to the machine by suitable fastening means, such as 27. Compressed air for operating the piston 24 may be fed through the pipes 28 and 29, as disclosed in the copending case.

At its lower end the tubular member 23 carries a core 30 having thereon a winding 31, which may be grounded to the core 30, as shown at 32, and the other end 33 of which is attached to the upper end of a heating coil 34, wound upon a core 35, carried by the lower end of the tube 23, the other end of the coil 34 being grounded to the core 35, as shown at 36. The winding 31 constitutes the secondary winding of a transformer whose primary winding is designated by reference character 37 and which is wound within the hollow core 38, although here shown diagrammatically as surrounding said core. The said core 38 is secured to the machine by any suitable fastening means, such as 39. Power may be supplied to this coil through the leads 40 and 41.

In operation it will be understood that the work-piece will be secured in that chuck 6 which happens to be in the loading position and thereupon the machine is put into action, whereupon all the chucks will be moved one position to the left, so that each chuck will occupy the position formerly held by the preceding one. Thus a work-piece inserted in any chuck will be successively treated by the various tools until it finally reaches the chuck 6, shown in the immediate front, which is the heating and hardening position.

When the work-piece is in this position the chuck 6 will continue to rotate the work-piece and by any desired means, preferably automatically controlled by the machine itself, although it may be manually controlled, if preferred, air will be admitted to the cylinders 19 and 26 which will depress the pistons 17 and 24, thus carrying the nozzle portion 15 of the tube 14 to a position well below the bottom of the work-piece 7, while simultaneously carrying the heating coil 34 into a position within the bore of the hub 7 and simultaneously carrying the core 30 and its surrounding coil 31 into electrical cooperation with the core 38 and the primary winding 37, so that said two windings at this time will form a transformer. At this time power may be supplied to the leads 40 and 41 to induce secondary power in the winding 31 which will flow through the lead 33 and the ground connection to the terminals of the heating coil 34, thereby producing intense heat in the inner portions of the hub 7 by electromagnetic high frequency induction, as disclosed in my copending case above referred to.

While the power may be turned on and off to supply the winding 37, in one form of my invention, the leads 40 and 41 are left continuously connected to the power supply and the power control is secured purely by bringing the secondary winding 31 and its core 30 into and out of the primary winding and core and either method may, of course, be used, as preferred, in any given instance.

When the article has been heated to a sufficient degree the heating coil is withdrawn by supplying compressed air through the pipe 29 in the cylinder 26 to thus lift out the core 35 with its heating coil 34. The nozzle 15 may then be brought into position within the hub 7 by applying compressed air to the cylinder 19 and when the nozzle 15 is in proper position within the bore of the hub a quenching liquid will be sprayed thereinto from the pipe 14 to harden the inner surface portions of the said hub or other work-piece 7.

Alternatively the nozzle 15 may be lowered in advance of the heating coil and withdrawn after withdrawal of the heating coil, by proper timing of the operation of their respective pneumatic work cylinders.

When the quenching action has been completed, further air pressure may be applied to the pipe 22 to raise the piston 17 to the top of its stroke and lift the nozzle 15 clear of the work-piece 7 so that the said work-piece may move past the lower end of the pipe 14 into the next work position, so that the finished work-piece may be removed at the next station and a new one inserted.

It will be understood that the various shafts, gears and other mechanism forming part of the machine tool, do not constitute elements of the present invention. Such mechanism is old and is disclosed in the prior patents above referred to, which should be consulted for the details of their construction.

The present invention relates solely to the modification of such machine, so that it may be adapted for combination with induction heating and quenching means of the type disclosed in my copending case.

By thus combining the heating and quenching means with a machine for performing the actual machining operations on the articles, it is obvious that I have provided a great economy in floor space and in expense of machinery, as well as in manual labor that would be required if the operations were performed in two separate machines.

For example, if all the machining were done on one machine this would require a complete machine with an attendant, who would chuck and center the work-pieces and remove the finished-machined articles therefrom and another machine and operator would take the machined work-pieces and clamp them in position, after centering them in the other machine whose function would be solely the heating and quenching. This second machine, as formerly constructed and as disclosed in my prior cases above referred to, of course, would be more expensive to make on a framework of its own and would require additional space for its installation, as well as requiring the additional labor of its attendant, who could probably not also attend the other machine simultaneously.

By combining the two into a single machine, however, it is obvious that great economies in all these respects are attainable.

While I have disclosed herein a single preferred embodiment of the invention it is obvious that the invention is not limited to machines of the particular type disclosed herein, but may also be adapted with certain necessary changes to other types of automatic machine tools, wherein a number of operations are performed on work-pieces. The invention is, therefore, to be considered not as limited to the specific embodiment disclosed but only limited in scope by the following.

I claim:

1. A multiple machine tool comprising individual mechanism for performing various operations in succession on a work-piece including at least one machining operation adapted to prepare a surface on said work-piece for hardening, said machine tool comprising as one of its tools a mechanism for heating and quenching a hardenable work-piece.

2. A multiple machine tool comprising individual mechanisms for performing various operations in succession on a work-piece including a machining operation, said machine tool also comprising as one of its tools a high frequency induction heating device for a work-piece.

3. A multiple machine tool comprising individual mechanisms for performing various operations in succession on rotating work-pieces at least one of said operations being adapted to form a surface to be heat-treated, said machine tool comprising as one of its tools a high frequency induction heating device having a portion which will enter into a hollow rotating work-piece to heat the interior of the same while it is rotating.

4. A multiple machine tool comprising individual mechanisms for performing various operations in succession on a work-piece preparatory to hardening a surface on said work-piece, said machine tool comprising as one of its tools a high frequency induction heating device for a work-piece, and means associated therewith for supplying a quenching medium to the heated workpiece.

5. A multiple machine tool comprising individual mechanisms for performing various operations in succession on rotating work-pieces preparatory to hardening said work-pieces, said machine tool comprising as one of its tools a high frequency induction heating device having a portion which will enter into a hollow rotating work-piece to heat the interior of the same while it is rotating, means for withdrawing the said portion of the heating device from the work-piece, and means for inserting in place thereof a nozzle for supplying a quenching liquid to the heated portion of the work-piece.

6. A multiple machine tool comprising individual mechanisms for performing various operations in succession on rotating work-pieces including a machining operation, said machine tool comprising as one of its tools a high frequency induction heating device having a portion which will enter into a hollow rotating work-piece to heat the interior of the same while it is rotating, and pneumatic means for moving said heating device into and out of the work-piece.

7. A multiple machine tool comprising individual mechanisms for performing various operations in succession on rotating work-pieces including a machining operation, said machine tool comprising as one of its tools a high frequency induction heating device having a portion which will enter into a hollow rotating work-piece to heat the interior of the same while it is rotating, pneumatic means for withdrawing the said portion of the heating device from the work-piece, and pneumatic means for inserting in place thereof a nozzle for supplying a quenching liquid to the heated portion of the work-piece.

W. H. FARR.